United States Patent [19]
Christe

[11] 3,879,526
[45] Apr. 22, 1975

[54] HIGH ENERGY OXIDIZERS AND METHOD OF SYNTHESIZING SAME

[75] Inventor: Karl O. Christe, Calabasas, Calif.

[73] Assignee: Rockwell International Corporation, El Segundo, Calif.

[22] Filed: Dec. 4, 1972

[21] Appl. No.: 312,014

[52] U.S. Cl. ............... 423/277; 423/466; 423/592
[51] Int. Cl. ... C01b 35/00; C01b 7/24; C01g 55/00
[58] Field of Search ............ 423/276, 466, 592, 277

[56] References Cited
UNITED STATES PATENTS
3,320,031  5/1967  Grosse et al. ...................... 423/466

Primary Examiner—F. C. Edmundson
Attorney, Agent, or Firm—L. Lee Humphries; Robert M. Sperry

[57] ABSTRACT

The cation $ClO_2F_2^+$ is synthesized by reacting $FClO_2$ with $PtF_6$ to produce $ClO_2F_2^+PtF_6^-$ and several additional salts, containing this cation, are produced by displacement techniques.

15 Claims, No Drawings

HIGH ENERGY OXIDIZERS AND METHOD OF SYNTHESIZING SAME

BACKGROUND OF THE INVENTION

The invention herein described was made in the course of or under a contract with the Department of the Navy.

1. Field of the Invention

This invention relates to compositions of matter and is particularly directed to compounds containing the cation $ClO_2F_2^+$ and methods of synthesizing such compounds.

2. Prior Art

Compositions of matter which contain oxygen and fluorine have been found to be extremely useful in formulating energetic materials, such as solid propellants, explosives and the like. Many simple compounds containing these elements have been disclosed heretofore. However, it has been recognized that more energetic compositions could be formulated by synthesizing more complex compositions containing multiple atoms of these elements. Unfortunately, it has been found that these more complex compositions cannot be produced from elementary fluorine by conventional methods. Accordingly, considerable effort has been expended to discover and find methods for producing these complex compositions.

BRIEF SUMMARY AND OBJECTS OF INVENTION

These disadvantages of the prior art are overcome with the present invention and several compositions containing the cation $ClO_2F_2^+$ have been synthesized by reacting $FClO_2$ with $PtF_6$ to produce $ClO_2F_2^+PtF_6^-$ and employing displacement techniques to produce several additional salts containing this cation, such as $ClO_2F_2^+BF_4^-$ and $ClO_2F_2^+AsF_6^-$.

Accordingly, it is an object of the present invention to provide new, highly-energetic compositions of matter.

Another object of the present invention is to provide methods of synthesizing new, highly-energetic compositions of matter.

An additional object of the present invention is to provide complex compositions containing multiple atoms of oxygen and fluorine.

A specific object of the present invention is to provide several compositions containing the cation $ClO_2F_2^+$ by reacting $FClO_2$ with $PtF_6$ to produce $ClO_2F_2^+PtF_6^-$ and employing displacement techniques to produce additional salts containing this cation, such as $ClO_2F_2^+BF_4^-$ and $ClO_2F_2^+AsF_6^-$.

These and other objects and features of the present invention will be apparent from the following detailed description.

DETAILED DESCRIPTION OF THE INVENTION

In that form of the present invention chosen for purposes of illustration, it has been found that $FClO_2$ can be reacted with $PtF_6$ to produce $ClO_2F_2^+PtF_6^-$ and displacement techniques, using this reaction product, can be employed to produce additional salts containing the $ClO_2F_2^+$ cation. Among these additional salts are $ClO_2F_2^+BF_4^-$ and $ClO_2F_2^+AsF_6^-$.

EXAMPLE I

The $FClO_2$-$PtF_6$ System

Platinum hexafluoride (17.0 mmole) and $FClO_2$ (46.1 mmole) were combined at $-196°$ (all temperatures in this and other examples are degrees centigrade) in a passivated (with $ClF_3$) 75-ml stainless steel cylinder. The starting materials, platinum hexafluoride and $FClO_2$, are available commercially from Ozark Mahoning Co., Tulsa, Oklahoma. The temperature of $-196°$ was selected as one at which the starting materials have no volatility. The cylinder was placed at room temperature to allow the mixture contained therein to slowly warm up to $25°$ without the addition of external heat. This required approximately 30 minutes to one hour, after which, the mixture was kept at this temperature for three days. The cylinder was cooled to $-196°$ and 3.75 mmole of material volatile at this temperature was removed and identified as $F_2$ by its vapor pressure and mass spectrum. The products volatile at $25°$ were separated by fractional condensation through traps kept at $-78°$, $-126°$ and $-196°$. The $-126°$ fraction consisted of $FClO_2$ (28.7 mmole) and the $-196°$ one of $FClO_2$ (0.3 mmole), $ClF_5$ (0.1 mmole), and a small amount of $FClO_3$. The cylinder contained a stable canary yellow solid (6.618 g), which was identified by infrared spectroscopy as a mixture of $ClO_2^+PtF_6^-$ and $ClO_2F_2^+PtF_6^-$. Hence, $PtF_6$ (17.0 mmole) had reacted with $FClO_2$ (17.1 mmole) in a 1:1 mole ratio yielding $F_2$ (3.75 mmole), $ClO_2^+PtF_6^-$ (12.2 mmole), and $ClO_2F_2^+PtF_6^-$ (4.8 mmole) as the main products. It was found that $PtF_6$ and $FClO_2$, when combined at $-196°$ and allowed to slowly warm up to $25°$ by placing the container at room temperature for 30 minutes to one hour interacted according to:

$$2FClO_2 + 2PtF_6 \rightarrow ClO_2F_2^+PtF_6^- + ClO_2^+PtF_6^-$$

(1)

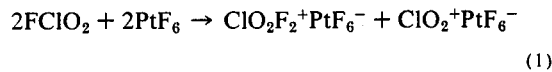

This mixture may then be employed as a starting material for producing a plurality of pure salts containing the $ClO_2F_2^+$ cation, as described in the following examples. The yield of $ClO_2F_2^+$ was not 50 percent as expected from the above equation, but generally about 25 percent owing to the following competing reaction:

$$2FClO_2 + 2PtF_6 \rightarrow 2ClO_2^+PtF_6^- + F_2$$

(2)

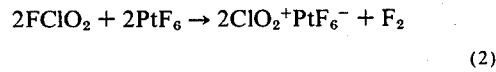

In some of the experiments, small amounts of $ClF_6^+PtF_6^-$ or $ClF_5$ and $FClO_3$ were observed, depending on the exact reaction conditions. The formation of some $FClO_3$ is not surprising since it is known that $FClO_2$ readily interacts with nascent oxygen to yield $FClO_3$.

Further modification of the reaction conditions (rapid warm up of the $FClO_2$-$PtF_6$ mixture from $-196°$ to either $-78°$ or $25°$ and completion of the reaction at $25°$) did not produce detectable amounts of either $ClO_2F_2^+$ or $ClF_6^+PtF_6^-$, but only $ClO_2^+PtF_6^-$ and $ClF_5$, $F_2$, and $O_2$. This indicates that the nature of the reaction products are more influenced by the warm-up rate of the starting materials from $-196°$ to about $-78°$ than by the final reaction temperature. Slow warm up favors the formation of $ClO_2F_2^+$, whereas rapid warm up yields $ClF_6^+$ or $ClF_5$ and $F_2$.

EXAMPLE II

Synthesis of $ClO_2F_2^+$ Salts

The synthesis of $ClO_2F_2^+PtF_6^-$ has been described in Example I. For the synthesis of $ClO_2F_2^+BF_4^-$, a mixture of $ClO_2F_2^+PtF_6^-$ (4.8 mmole) and $ClO_2^+PtF_6^-$ (12.2 mmole) was treated in a passivated (with $ClF_3$ and $BrF_5$) 75 ml stainless steel cylinder with $FNO_2$ (25.3 mmole) at $-78°$ for 48 hours. The reaction products volatile at 25° consisted of $FClO_2$, $ClF_3O_2$, and unreacted $FNO_2$ and were separated by fractional condensation through a series of traps kept at $-112°$, $-126°$, $-142°$ and $-196°$. The $-126°$ fraction contained most of the $ClF_3O_2$ and some $FClO_2$. Attempts to further separate the $ClF_3O_2$ and $FClO_2$ mixture by fractional condensation were unsuccessful. Consequently, 2.76 mmole of this mixture was combined with $BF_3$ (3.00 mmole) at $-196°$ in a passivated ampoule formed of perfluoroethylenepropylene copolymer and the temperature was cycled several times between $-196$ and 25°. The product was kept at $-78°$ for several hours and unreacted $BF_3$ (0.22 mmole) was removed at this temperature in vacuo. Removal of volatile material in vacuo was continued at 20°. The volatile material (2.70 mmole) consisted according to its infrared spectrum of a 1:1 mixture of $FClO_2$ and $BF_3$. The white solid, nonvolatile residue (280 mg = 1.46 mmole) was identified by infrared, Raman, and $^{19}F$ nmr spectroscopy as $ClO_2F_2^+BF_4^-$.

For the preparation of the $AsF_6^-$ salt, $ClO_2F_2^+BF_4^-$ (0.62 mmole) and $AsF_5$ (1.43 mmole) were combined at $-196°$ in a passivated ampoule formed of perfluoroethylenepropylene copolymer. The contents of the ampoule was kept at $-78°$ for 30 minutes and at 25° for 1 hour. Volatile products were removed at 25°C and consisted of unreacted $AsF_5$ (0.79 mmole) and $BF_3$ (0.59 mmole). The white, stable solid weighted 185 mg (weight calculated for 0.62 mmole of $ClF_2O_2^+AsF_6^-$ = 183 mg) and was identified as $ClF_2O_2^+AsF_6^-$ by infrared, Raman, and $^{19}F$ nmr spectroscopy.

Syntheses and Properties of $ClO_2F_2^+$ Salts

The synthesis of $ClO_2F_2^+PtF_6^-$ from $FClO_2$ and $PtF_6$ and its temperature dependence has been discussed above. The $BF_4^-$ and $AsF_6^-$ salts were prepared according to the following scheme:

$$ClO_2^+PtF_6^- + ClO_2F_2^+PtF_6^- + 2FNO_2 \rightarrow FClO_2 + ClF_3O_2 + 2NO_2^+PtF_6^-$$

(3)

Unreacted $FNO_2$ and some of the $FClO_2$ could be separated from $ClF_3O_2$ by fractional condensation. The remaining $FClO_2$ was separated from $ClF_3O_2$ by complexing with $BF_3$. Since the resulting $ClO_2^+BF_4^-$ has a dissociation pressure of 182 mm at 22.1°, while $ClO_2F_2^+BF_4^-$ is stable, the former salt could be readily removed by pumping at 20°. Conversion of $ClO_2F_2^+BF_4^-$ to the corresponding $AsF_6^-$ salt was accomplished through displacement of $BF_4^-$ by the stronger Lewis acid $AsF_5$.

All three salts, synthesized with the $ClO_2F_2^+$ cation and fluorine-containing anions, $ClO_2F_2^+PtF_6^-$, $ClO_2F_2^+AsF_6^-$, and $ClO_2F_2^+BF_4^-$, are solids, stable at 24°, and react violently with water or organic materials. The $PtF_6^-$ compound is canary yellow, while those of $AsF_6^-$ and $BF_4^-$ are white. The salts dissolve in anhydrous HF without decomposing. They are crystallinic in the solid state and the x-ray powder diffraction patterns of $ClF_2O_2^+BF_4^-$ and $ClO_2F_2^+AsF_6^-$ are listed in Table I.

TABLE I

X-Ray Powder Patterns for $ClO_2F_2^+BF_4^-$ and $ClO_2F_2^+AsF_6^-$

| $ClO_2F_2^+BF_4^-$ | | $ClO_2F_2^+AsF_6^-$ | | Continued | |
|---|---|---|---|---|---|
| d,A | Intensity | d,A | Intensity | d,A | Intensity |
| 5.47 | s | 7.49 | w | 2.12 | w |
| 5.06 | m | 5.50 | ms | 2.01 | w |
| 4.37 | ms | 4.98 | w | 1.94 | mw |
| 4.15 | w | 4.35 | ms | 1.90 | mw |
| 3.70 | vs | 4.02 | w | 1.86 | w |
| 3.56 | s | 3.86 | s | 1.80 | w |
| 3.00 | m | 3.70 | w | 1.76 | mw |
| 2.77 | m | 3.57 | m | 1.72 | w |
| 2.57 | vs | 3.40 | mw | 1.70 | mw |
| 2.41 | m | 3.02 | mw | 1.65 | w |
| 2.18 | s | 2.77 | m | 1.62 | w |
| 2.08 | s | 2.69 | m | 1.59 | w |
| 1.86 | ms | 2.60 | w | 1.54 | w |
| 1.80 | w | 2.41 | w | 1.50 | w |
| | | 2.30 | w | 1.41 | w |
| | | 2.20 | w | 1.37 | w |
| | | | | 1.34 | w |

The powder pattern of $ClO_2F_2^+BF_4^-$ is much simpler than that of $ClO_2F_2^+AsF_6^-$. This is not surprising since the anion and cation in the former salt are both approximately tetrahedral and of similar size. The powder pattern of $ClO_2F_2^+BF_4^-$ can be indexed on the basic of an orthorhombic unit cell with $a = 5.45$, $b = 7.23$, and $c = 13.00A$. Assuming four molecules per unit cell and neglecting contributions from the highly charged central atoms to the volume, a plausible average volume of 16 A per F or O atom is obtained. However, the agreement between the observed and calculated reflections is somewhat poor for several lines and, hence, the above unit cell dimensions are tentative.

The thermal stability of $ClO_2F_2^+BF_4^-$ is higher than those of $ClO_2^+BF_4^-$, $ClF_2^+BF_4^-$, or other similar salts. This is in good agreement with the previously made correlations between the stability of an adduct and the structure of the parent molecule and its ions. Thus, tetrahedral $ClO_2F_2^+$ (see below) should be energetically much more favorable than trigonal bypyramidal $ClF_3O_2$.

F-nmr Spectra

A broad singlet at $-310$ ppm relative to external $CFCl_3$ has been observed for $ClO_2F_2^+PtF_6^-$ in anhydrous HF. The spectrum of $ClF_2O_2^+BF_4^-$ in HF shows a strong temperature dependence. At 30° it consists of a single peak at 185 ppm relative to external $CFCl_3$. With decreasing temperature the peak at first becomes broader, then separates at about 0° into signals at $-301$ ($ClO_2F_2^+$), 146 ($BF_4^-$), and 194 ppm (HF) which become narrower with further decrease in temperature. The observed peak area ratio of approximately 2:1 for the 146 and $-301$ ppm signals confirms their assignment of $BF_4^-$ and $ClO_2F_2^-$, respectively, and proves the ionic nature of the $ClF_3O_2.BF_3$ adduct in HF solution.

The spectrum of $ClF_2O_2^+AsF_6^-$ in HF (which was acidified with $AsF_5$) consists of two resonances at $-307$ ($ClO_2F_2^+$) and 105 ppm (HF, $AsF_5$, $AsF_6^-$), respectively. Rapid exchange between HF, $AsF_5$ and $AsF_6^-$ preempted the measurement of the $ClO_2F_2^+$ to $AsF_6^-$ peak area ratio.

Obviously, numerous variations and modifications may be made without departing from the present invention. Accordingly, it should be clearly understood that the forms of the present invention described above are

What is claimed is:

1. The composition of matter consisting of a salt having the cation $ClO_2F_2^+$, and an anion selected from the group consisting of $AsF_6^-$, $BF_4^-$ and $PtF_6^-$.

2. The composition of claim 1 wherein the anion of said salt is $PtF_6^-$.

3. The composition of claim 1 wherein the anion of said salt is $BF_4^-$.

4. The composition of claim 1 wherein the anion of said salt is $AsF_6^-$.

5. The method of synthesizing a salt having a difluoroperchloryl cation, said method comprising the steps of:

combining $PtF_6$ and $FClO_2$ in a container at a starting temperature at which these materials have no volatility, gradually increasing the temperature of said materials without the addition of external heat until the reaction is complete, separating the volatile products, and removing the resulting $ClO_2F_2^+PtF_6^-$ salt from said container.

6. The method of claim 5 wherein said starting temperature is −196°C.

7. The method of claim 5 wherein said gradually increasing step comprises exposing said container to room temperature.

8. The method of claim 7 wherein said container is exposed to room temperature for a period of approximately 30 minutes to 1 hour.

9. The method of claim 7 wherein said room temperature is 25°C.

10. The method of claim 5 comprising the further steps of:

combining said $ClO_2F_2^+PtF_6^-$ salt with $FNO_2$ at a reaction temperature such that said $FNO_2$ is in a liquid state, maintaining said reaction temperature until the reaction is complete, separating the volatile products by fractional condensation in a series of traps kept at −112°C and −126°C, respectively, combining the condensate of the −126°C trap with $BF_3$ at a temperature at which the materials have no volatility, raising the temperature of said condensate to 20°C and removing all volatile materials, and recovering the resulting $ClO_2F_2^+BF_4^-$ salt as a nonvolatile solid.

11. The method of claim 10 wherein said reaction temperature is −78°C.

12. The method of claim 10 wherein said maintaining step is continued for approximately 48 hours.

13. The method of claim 10 comprising the further steps of:

combining said $ClO_2F_2^+BF_4^-$ salt and $AsF_5$ in a container at a temperature at which these materials have no volatility, raising the temperature of said container to a temperature at which said $AsF_5$ is liquid, maintaining said container at said temperature at which $AsF_5$ is liquid until the reaction is complete, raising the temperature of said container to ambient temperature, removing the volatile materials, and recovering the resulting $ClO_2F_2^+AsF_6^-$ salt as a nonvolatile solid.

14. The method of claim 13 wherein said temperature at which $AsF_5$ is liquid is −78°C.

15. The method of claim 13 wherein said maintaining step is continued for approximately 30 minutes.

* * * * *